US012711883B2

(12) United States Patent
Furukawa et al.

(10) Patent No.: US 12,711,883 B2
(45) Date of Patent: Aug. 18, 2026

(54) DISPLAY DEVICE

(71) Applicant: SHARP KABUSHIKI KAISHA, Sakai City (JP)

(72) Inventors: Hiroyuki Furukawa, Sakai City (JP); Chie Toridono, Sakai City (JP); Masafumi Ueno, Sakai City (JP); Masafumi Kawai, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/292,519

(22) PCT Filed: Sep. 22, 2021

(86) PCT No.: PCT/JP2021/034701

§ 371 (c)(1),
(2) Date: Jan. 26, 2024

(87) PCT Pub. No.: WO2023/047480

PCT Pub. Date: Mar. 30, 2023

(65) Prior Publication Data

US 2025/0087123 A1 Mar. 13, 2025

(51) Int. Cl.
*G09G 3/00* (2006.01)
*G09G 3/3208* (2016.01)

(52) U.S. Cl.
CPC ........... *G09G 3/007* (2013.01); *G09G 3/3208* (2013.01); *G09G 2320/0257* (2013.01)

(58) Field of Classification Search
CPC ................ G09G 3/3208; G09G 3/035; G09G 2320/0257; G09G 2320/046; G09G 2320/103; H05K 5/0217
See application file for complete search history.

(56) References Cited

U.S. PATENT DOCUMENTS

2003/0231257 A1 12/2003 Ochiai et al.
2004/0100584 A1 5/2004 Takagi et al.
2019/0197960 A1* 6/2019 Kim ....................... G09G 3/035
2020/0074708 A1* 3/2020 Park ........................ G06T 11/60
(Continued)

FOREIGN PATENT DOCUMENTS

JP H04223780 A 8/1992
JP 2003-304410 A 10/2003
(Continued)

*Primary Examiner* — Benjamin C Lee
*Assistant Examiner* — Emily J Frank
(74) *Attorney, Agent, or Firm* — ScienBiziP, P.C.

(57) ABSTRACT

A display device includes a display panel including a display region in which an input image corresponding to input image data is displayed and a non-display region which is a region other than the display region, each of the display region and the non-display region including a plurality of self-light-emitting elements, a moving mechanism configured to move the display panel along the display region, and a control unit configured to change a position of the display region in the display panel in such a manner that, when controlling the moving mechanism to move the display panel, the position of the display region in space is maintained the same. The control unit lights the non-display region when the input image is displayed in the display region.

8 Claims, 12 Drawing Sheets

(56) References Cited

U.S. PATENT DOCUMENTS

| | | | | |
|---|---|---|---|---|
| 2020/0320908 | A1* | 10/2020 | Kim | G09G 3/035 |
| 2021/0035524 | A1* | 2/2021 | Chun | G06T 3/40 |
| 2021/0201723 | A1* | 7/2021 | Choi | G09G 3/3233 |
| 2022/0351657 | A1* | 11/2022 | Yim | G09G 3/035 |
| 2022/0415226 | A1* | 12/2022 | Kim | G09G 3/035 |
| 2023/0093986 | A1* | 3/2023 | Eom | H04M 1/0235 361/679.27 |
| 2023/0122237 | A1* | 4/2023 | Huang | G09G 3/035 345/204 |
| 2023/0127541 | A1* | 4/2023 | Kim | G06F 1/3218 361/679.27 |
| 2023/0306884 | A1* | 9/2023 | Choi | G06F 1/1626 |

FOREIGN PATENT DOCUMENTS

| | | | |
|---|---|---|---|
| JP | 2004-159081 | A | 6/2004 |
| JP | 2006-284745 | A | 10/2006 |
| JP | 2020-173315 | A | 10/2020 |

* cited by examiner

DISPLAY DEVICE

TECHNICAL FIELD

The disclosure relates to a display device.

BACKGROUND ART

In recent years, display devices using self-light-emitting elements such as organic light emitting diodes (OLEDs) as a light source have been actively developed. In display devices using such self-light-emitting elements as a light source, the lighting capability of the self-light-emitting elements is reduced due to the lighting of the self-light-emitting elements at high luminance for a long time. As a result, there arises a problem of so-called image sticking where the image display function of the display device is impaired.

A technique for solving the above-described problem of image sticking is disclosed in, for example, the following JP2020-173315 A. In the technique disclosed in JP2020-173315 A, a display panel includes a display region in which an input image corresponding to input image data is displayed and a non-display region in which the input image corresponding to the input image data is not displayed. The display region is not covered with a blocking member, but the non-display region is covered with a blocking member.

In this state, while physically moving the display panel along the display region at a predetermined speed, the display region is moved in the display panel at the same speed as the predetermined speed in a direction opposite to the moving direction of the display panel. Thus, even when the display panel is physically moved, a viewer can continue to view the input image, which is displayed in the display region, at the same position in space. On the other hand, the input image is not displayed in the non-display region. Therefore, a pixel group constituting the non-display region is not lit at all.

PTL 1: JP2020-173315 A

SUMMARY

Technical Problem

Even with the technique described above, there may be a case where the difference between the image sticking amount of a pixel group which becomes the display region for a long time and the image sticking amount of a pixel group which becomes the display region for only a short time is large. In this case, the contrast at a boundary between the pixel group having a large image sticking amount and the pixel group having a small image sticking amount is conspicuous.

The disclosure has been made in view of the problem described above. An object of the disclosure is to provide a display device capable of making inconspicuous the contrast at a boundary between a pixel group having a large image sticking amount and a pixel group having a small image sticking amount.

Solution to Problem

According to one aspect of the disclosure, there is provided a display device including a display panel including a display region in which an input image corresponding to input image data is displayed and a non-display region being a region other than the display region, each of the display region and the non-display region including a plurality of self-light-emitting elements, a moving mechanism configured to move the display panel along the display region, and a control unit configured to change a position of the display region in the display panel in such a manner that, when controlling the moving mechanism to move the display panel, the position of the display region in space is maintained, wherein the control unit lights the non-display region when the input image is displayed in the display region.

DESCRIPTION OF EMBODIMENTS

Figure 1:
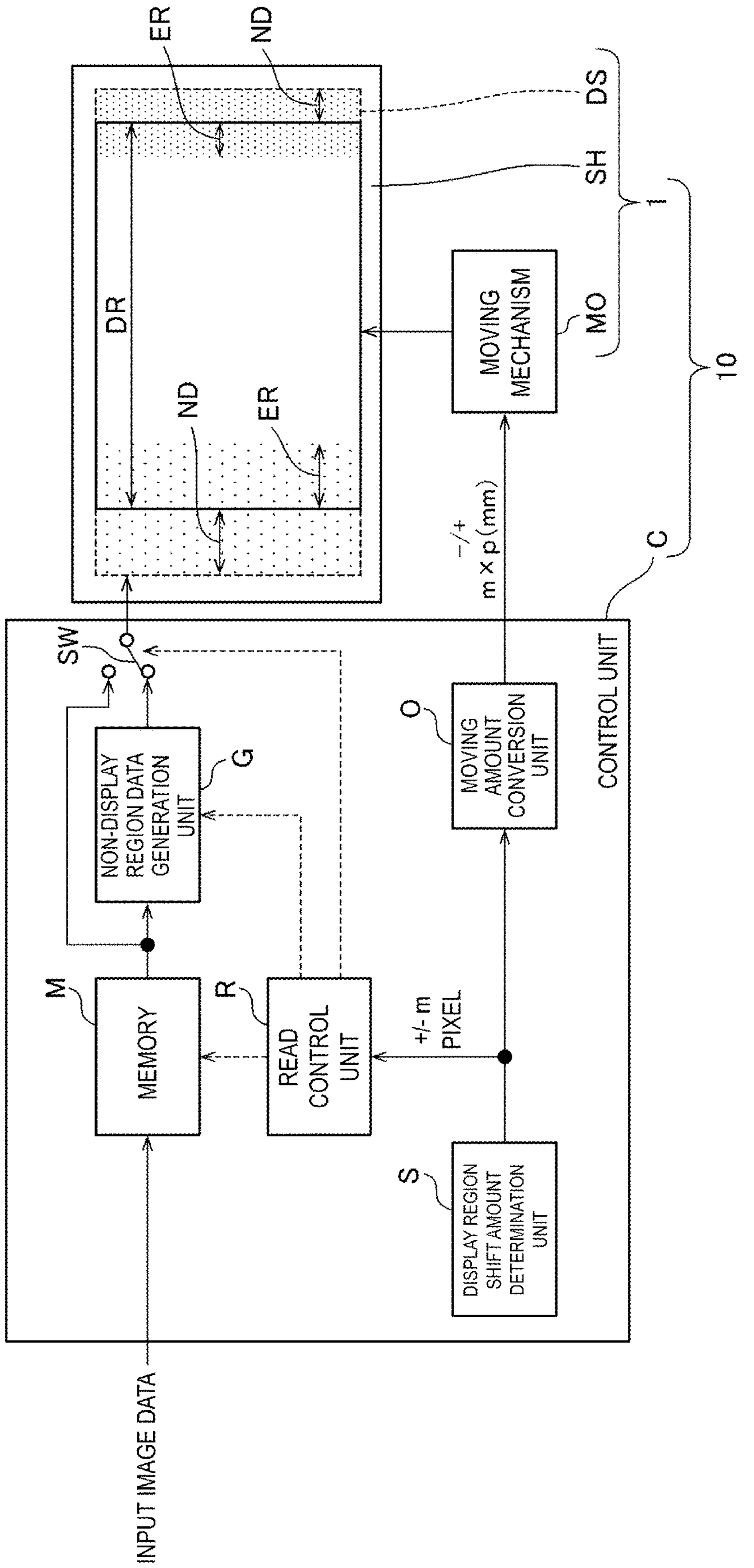
FIG. 1 is a diagram illustrating an overall configuration of a display device according to a first embodiment.

Hereinafter, display devices according to the present embodiments will be described with reference to the accompanying drawings. Note that, in the drawings, the same or equivalent elements are denoted by the same reference numerals and signs, and repeated descriptions thereof will be omitted.

First Embodiment

FIG. 1 is a diagram illustrating an overall configuration of the display device according to the first embodiment. Note that, in FIG. 1, a double-headed arrow indicates a region having its width. As illustrated in FIG. 1, a display device 10 includes a display portion 1 and a control unit C. The display portion 1 includes a display panel DS, a moving mechanism MO, and a light blocking portion SH.

The display panel DS has a rectangular shape. Inside the rectangular display panel DS, a group of pixels are disposed in a matrix (in a vertical direction and a horizontal direction). The display panel DS includes a display region DR in which an input image corresponding to input image data is displayed, and a non-display region ND which is a region other than the display region DR. Each of the display region DR and the non-display region ND has a plurality of self-light-emitting elements. As the self-light-emitting element, for example, use of an organic light emitting diode (OLED), a quantum dot light emitting diode (QLED), a micro light emitting diode (micro LED), or the like can be considered.

The display region DR is a region which moves along a display surface of the display panel DS under the control of the control unit C. In the present embodiment, the display region DR has a rectangular shape, but is not limited thereto. The non-display region ND is a region in which the input image corresponding to the input image data is not displayed. In the present embodiment, the non-display region ND has a rectangular shape, but is not limited thereto. As will be described later, the non-display region ND is lit in a predetermined mode under the control of the control unit C. In the present embodiment, the end display region ER and the non-display region ND adjacent thereto have the same shape and size, but no such limitation is intended.

The moving mechanism MO moves the display panel DS along a surface on which the display region DR extends. The moving mechanism MO of the present embodiment is a sliding mechanism which moves the display panel DS in a left-right direction along the display surface thereof. However, the moving mechanism MO may be a winding mechanism which is provided at each of the left and right ends of the display panel DS and winds the display panel DS. In this case, a portion which is not wound by the winding mechanism is used as the display region DR. Note that when the moving mechanism MO is a winding mechanism, the display panel DS is required to have high flexibility. Therefore, the display panel DS is preferably a display panel using OLED.

The control unit C includes a memory M, a non-display region data generation unit G, a read control unit R, a display region shift amount determination unit S, and a moving amount conversion unit O.

The display region shift amount determination unit S determines a shift amount m of the display region DR according to a predetermined condition. The shift amount m is the number of pixels to be moved. The predetermined condition is, for example, an average value of deterioration of all the pixels constituting the display panel DS. In this case, the shift amount m may be increased as the average value of deterioration of all the pixels increases.

The read control unit R receives, from the display region shift amount determination unit S, information capable of specifying the shift amount m of the display region DR. The read control unit R controls reading of data from the memory M, generation of input lighting data in the non-display region data generation unit G, and switching of the switch SW in accordance with the shift amount m.

The memory M stores input image data received from the outside of the display device 10. The input image data includes gray scale data indicating a gray scale value of each of a group of pixels constituting the display panel DS. The memory M outputs the input image data to the non-display region data generation unit G and the switch SW under the control of the read control unit R.

The non-display region data generation unit G receives the input image data read from the memory M. The non-display region data generation unit G generates input lighting data of the non-display region ND using the received input image data and outputs the input lighting data to the switch SW under the control of the read control unit R. In the first embodiment, the non-display region data generation unit G generates input lighting data for the left non-display region ND and input lighting data for the right non-display region ND.

The switch SW outputs either the input image data or the input lighting data to the display panel DS in accordance with the switching state thereof under the control of the read control unit R. The switch SW outputs the input image data to the display region DR of the display panel DS and outputs the left and right input lighting data to the left and right non-display regions ND of the display panel DS, respectively. Accordingly, the display region DR of the display panel DS displays the input image data, and the non-display region ND of the display panel DS is lit in a mode based on the input lighting data.

The moving amount conversion unit O receives, from the display region shift amount determination unit S, information capable of specifying the shift amount m of the display region DR. The moving amount conversion unit O determines a moving amount m×p (p is the length of one pixel in the movement direction) of the display panel DS based on the received information capable of specifying the shift amount m of the display region DR. The moving amount conversion unit O transmits information capable of specifying the determined moving amount m×p of the display panel DS to the moving mechanism MO. Note that, as described above, the moving mechanism MO moves the display panel DS along the display region DR of the display panel DS based on the information capable of specifying the moving amount m×p of the display panel DS received from the moving amount conversion unit O.

When the control unit C controls the moving mechanism MO to move the display panel DS, the control unit C changes the position of the display region DR in the display panel DS in such a manner that the position of the display region DR in space is maintained the same. The control unit C lights the non-display region ND when the input image is displayed in the display region DR. Specifically, the display region DR includes the end display region ER located at a predetermined distance from the non-display region ND. The control unit C lights the non-display region ND based on the input image data input to the end display region ER.

According to the display device 10 of the present embodiment as described above, it is possible to reduce the difference between the image sticking amount in the display region DR and the image sticking amount in the non-display region ND. As a result, since the display region DR moves, it is possible to make inconspicuous the contrast at a boundary between a pixel group having a large image sticking amount which becomes the display region DR for a long time and the pixel group which becomes the display region DR for only a short time.

Each of the memory M, the non-display region data generation unit G, the read control unit R, the display region shift amount determination unit S, and the moving amount conversion unit O is configured by a dedicated electronic circuit. However, at least one of the memory M, the non-display region data generation unit G, the read control unit R, the display region shift amount determination unit S, and the moving amount conversion unit O may be realized by software such as a display control program described later.

Figure 2A:
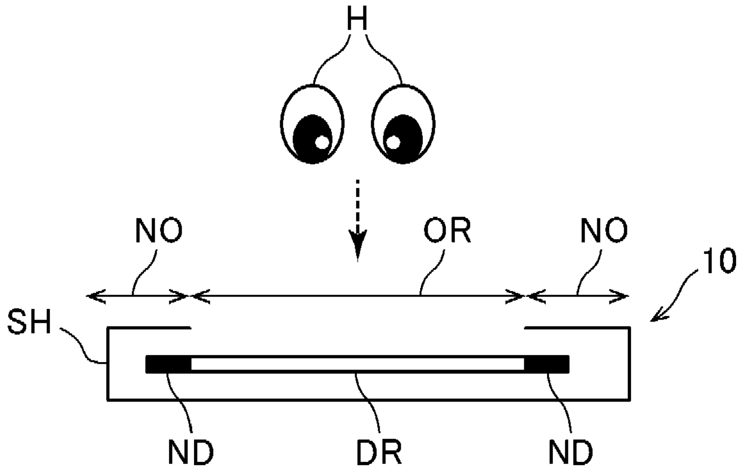
FIG. 2A is a first schematic cross-sectional view illustrating a positional relationship between a blocking portion, a display region, and a non-display region of the display device according to the first embodiment.
Figure 2B:
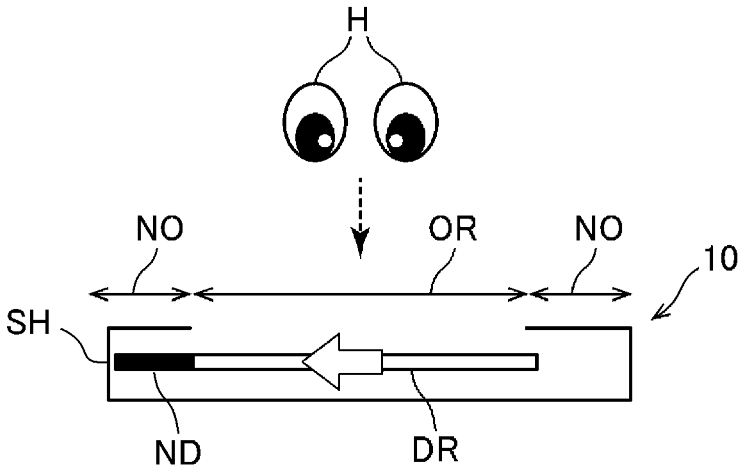
FIG. 2B is a second schematic cross-sectional view illustrating a positional relationship between the blocking portion, the display region, and the non-display region of the display device according to the first embodiment.
Figure 2C:
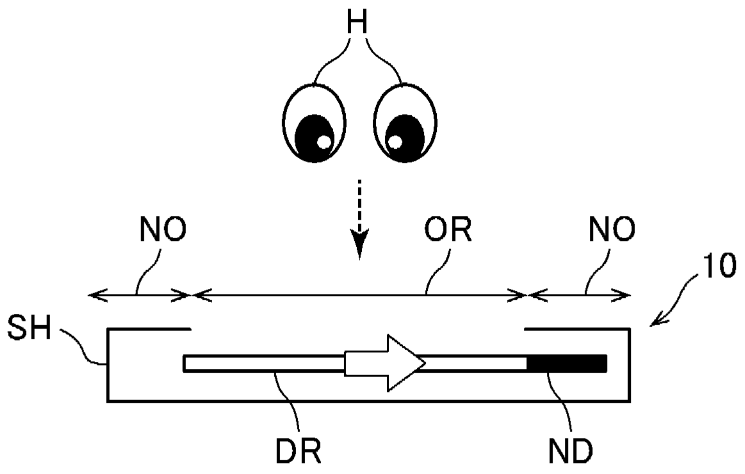
FIG. 2C is a third schematic cross-sectional view illustrating a positional relationship between the blocking portion, the display region, and the non-display region of the display device according to the first embodiment.
Figure 3:
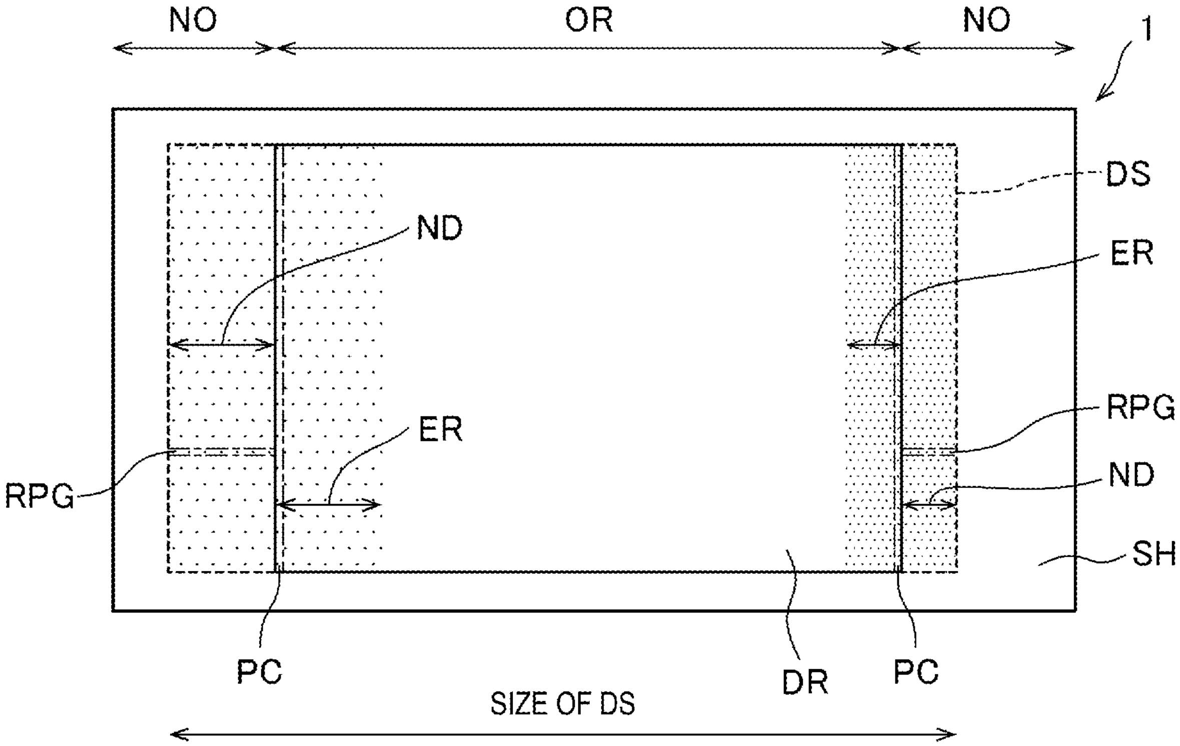
FIG. 3 is a front view illustrating a positional relationship between an end display region and the non-display region of the display device according to the first embodiment.

FIGS. 2A to 2C are, respectively, first to third schematic cross-sectional views illustrating the positional relationship between the blocking portion SH, the display region DR, and the non-display region ND of the display device according to the first embodiment. FIG. 3 is a front view illustrating the positional relationship between the end display region ER of the display region DR and the non-display region ND of the display device 10 according to the first embodiment.

As illustrated in FIGS. 2A to 2C and FIG. 3, the light blocking portion SH blocks light emitted from the non-display region ND. Therefore, the region covered by the light blocking portion SH is a non-observation region NO which cannot be visually recognized by a person H. A partial region of the display panel DS which is covered by the light blocking portion SH and thus cannot be visually recognized by the person H is the above-described non-display region ND. The display region DR is another partial region of the display panel DS which is not covered by the light blocking portion SH. Therefore, the display region DR is an observation region OR which can be visually recognized by the person H.

FIG. 2A illustrates a case where the shift amount m of the display region DR is 0. In this case, the moving amount m×p of the display panel DS is also 0. The display region DR is positioned at the center of the display panel DS. The non-display region ND exists on the left and right sides of the display panel DS.

FIG. 2B illustrates a case where the display region DR is shifted to the right end of the display panel DS. In this case, the display panel DS is conversely shifted to the left side. The position of the display region DR viewed from the person H is the same as that in FIG. 2A. The non-display region ND is present on the left of the display panel DS.

FIG. 2C illustrates a case where the display region DR is shifted to the left end of the display panel DS. In this case, the display panel DS is conversely shifted to the right side. The position of the display region DR viewed from the person H is the same as that in FIG. 2A. The non-display region ND exists on the right side of the display panel DS.

In the present embodiment, the light blocking portion SH covers only the end regions on both left and right sides of the display panel DS. However, the light blocking portion SH may cover the entire peripheral end region along the entire periphery of the display panel DS, or may cover only the end regions on both upper and lower sides of the display panel DS. That is, the light blocking portion SH may be anything as long as the light blocking portion SH covers at least a part of the display panel DS so as to create the non-observation region NO which cannot be visually recognized by the person H and the observation region OR which can be visually recognized by the person H in the display panel DS.

Note that FIG. 3 illustrates a pixel column PC in the end display region adjacent to the non-display region ND and a pixel group RPG included in one row, which will be described in the second embodiment described later.

Figure 4:
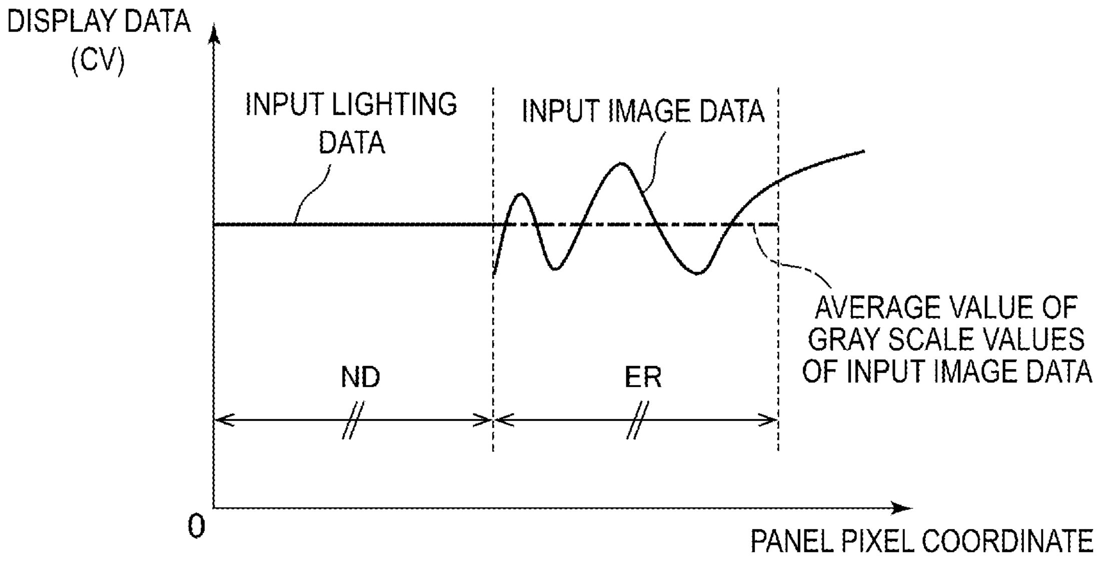
FIG. 4 is a graph showing a relationship between input image data in the end display region and input lighting data in the non-display region of the display device according to the first embodiment.

FIG. 4 is a graph showing a relationship between input image data of the left end display region ER and input lighting data in the non-display region ND of the display device 10 according to the first embodiment. In FIG. 4, input image data of only the end display region ER and the vicinity thereof in the display region DR is shown. That is, the non-display region data generation unit G generates input lighting data of the non-display region ND by using data corresponding to the end display region ER in the input image data. Note that, the relationship between the input image data in the right end display region ER and the input lighting data in the non-display region ND of the display device 10 according to the first embodiment is the same relationship although left and right are reversed.

As can be seen from FIG. 4, the input lighting data is data indicating an average value of the gray scale values of all the pixels in the end display region ER calculated based on the input gray scale data. In the present embodiment, the control unit C calculates the average value of the gray scale values of all the pixels in the end display region ER, and lights the entire non-display region ND with the average value of the gray scale values of all the pixels in the end display region ER. According to this, the image sticking amount in the non-display region ND can be set to be the average value of the image sticking amounts in the end display region ER. Therefore, in the display panel DS according to the first embodiment, since the display region DR and the non-display region ND can be degraded to the same extent, it is possible to make inconspicuous the contrast at the boundary between the pixel group having a large image sticking amount and the pixel group having a small image sticking amount.

Note that, the number of pixels in the horizontal direction of the display panel DS in the first embodiment may be, for example, larger than the number of pixels in the horizontal direction of the input image data. In this case, the control unit C can display the input image data and the input lighting data on the display panel DS without reducing the input image data or deleting a part of the input image data. In the first embodiment, the control unit C shifts the display region DR and the display panel DS in the left-right direction. However, the display device 10 of the disclosure is not limited thereto, and for example, the control unit C may shift the display region DR and the display panel DS in an up-down direction. The same applies to subsequent second, third, and fifth embodiments.

Second Embodiment

Next, a display device according to the second embodiment will be described. Note that description of respects similar to those in the first embodiment will not be repeated below. The present embodiment is different from the first embodiment in the following respects.

Figure 5:
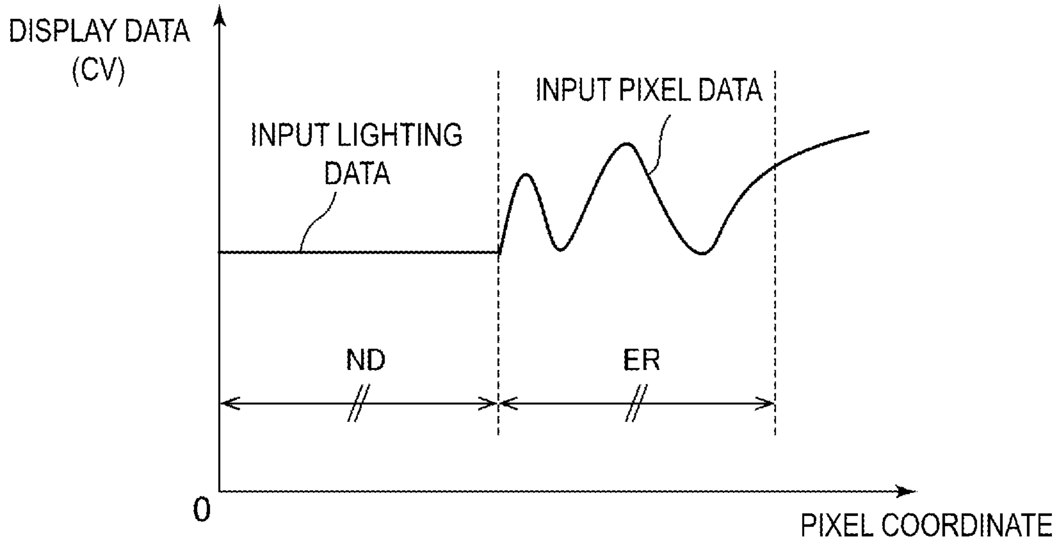
FIG. 5 is a graph showing a relationship between input image data in an end display region and input lighting data in a non-display region of a display device according to a second embodiment.

FIG. 5 is a graph showing a relationship between input image data in the left end display region ER and input lighting data in the non-display region ND of the display device 10 according to the second embodiment. As can be seen from FIG. 5, the input lighting data is data indicating a gray scale value of a pixel column (vertical direction) PC (see FIG. 3) or a pixel row (horizontal direction) in the end display region ER adjacent to the non-display region ND. Note that, the pixel column PC or the pixel row (not illustrated) means one line of a pixel group linearly arranged along a boundary line in the end display region ER adjacent to the boundary line between the non-display region ND and the end display region ER.

When the end display region ER includes the pixel column PC adjacent to the non-display region ND, the control unit C lights the non-display region ND based on a plurality of gray scale values included in the input image data input to the pixel column PC adjacent to the non-display region ND. That is, the non-display region data generation unit G generates input lighting data of the non-display region ND by using data corresponding to the pixel column PC in the input image data. On the other hand, when the end display region ER includes a pixel row (not illustrated) adjacent to the non-display region ND instead of the pixel column PC, the control unit C may light the non-display region ND based on a plurality of gray scale values included in the input image data input to the pixel row adjacent to the non-display region ND. That is, the non-display region data generation unit G may generate the input lighting data of the non-display region ND using data corresponding to the pixel row PC in the input image data.

The control unit C lights a pixel group RPG (see FIG. 3) included in one row in a direction in which one pixel at an extreme end in the end display region ER and another pixel adjacent to the above-described one pixel at the extreme end in the non-display region ND are arranged or a pixel group included in one column (vertical direction) with the same luminance. More specifically, as can be seen from FIG. 5, the control unit C lights the above-described pixel group RPG included in one row or the pixel group in one column with the same gray scale value as that of the above-described pixel at the extreme end of the end display region ER adjacent to the non-display region ND. Accordingly, the image sticking amount of the non-display region ND can be made equal to the image sticking amount of the pixel column PC (see FIG. 3) or the pixel row in the end display region ER adjacent to the non-display region ND.

Third Embodiment

Next, a display device according to the third embodiment will be described. Note that description of respects similar to those in the first embodiment will not be repeated below. The present embodiment is different from the first embodiment in the following respects.

Figure 6:
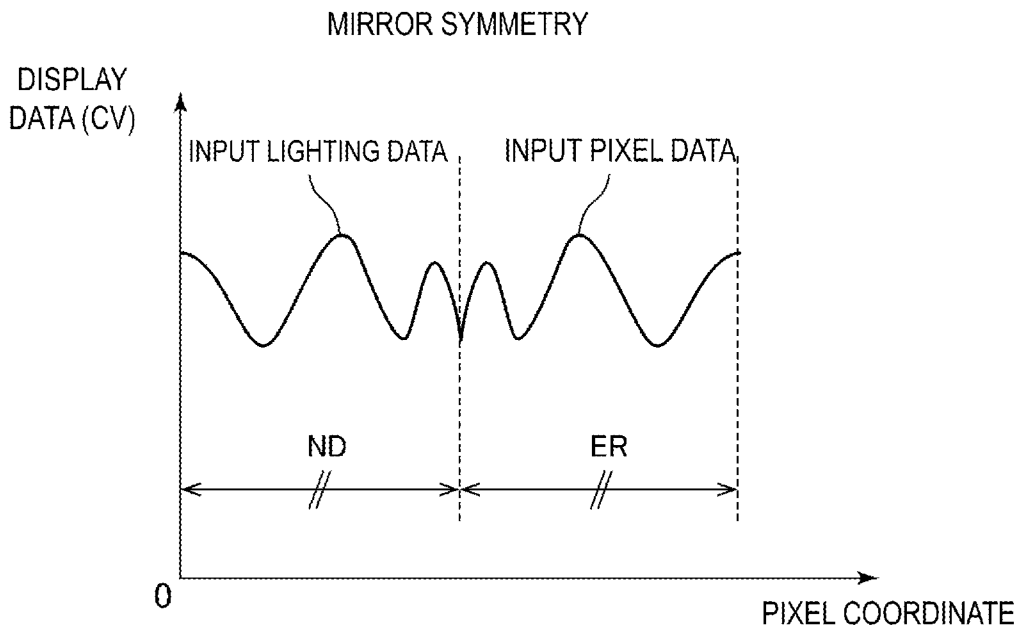
FIG. 6 is a graph showing a relationship between input image data in an end display region and input lighting data in a non-display region of a display device according to a third embodiment.

FIG. 6 is a graph showing a relationship between input image data in the left end display region ER and input lighting data in the non-display region ND of the display device 10 according to the third embodiment. As can be seen from FIG. 6, the gray scale value of the input image data input to the end display region ER and the gray scale value of the input lighting data input to the non-display region ND are mirror symmetrical with respect to the boundary line between the end display region ER and the non-display region ND.

In the present embodiment, the control unit C lights the non-display region ND based on the input lighting data in such a manner that a pattern that is mirror symmetrical to the input image displayed in the end display region ER appears in the non-display region ND. That is, the non-display region data generation unit G generates the input lighting data of the non-display region ND by inverting the data corresponding to the end display region ER among the input image data mirror symmetrically with respect to the boundary line between the end display region ER and the non-display region ND as the central axis. That is, the end display region ER and the non-display region ND adjacent to the end display region ER are lit mirror symmetrically with respect to the boundary line between the end display region ER and the non-display region ND. Accordingly, the image sticking amount of the non-display region ND and the image sticking amount of the end display region ER adjacent to the non-display region ND can be mirror symmetrical with respect to the boundary line between the end display region ER and the non-display region ND.

Fourth Embodiment

Next, a display device according to the fourth embodiment will be described. Note that description of respects similar to those in the first embodiment will not be repeated below. The present embodiment is different from the first embodiment in the following respects. In the fourth embodiment, the control unit C shifts the display region DR and the display panel DS in both the left-right direction and in the up-down direction.

Figure 7:
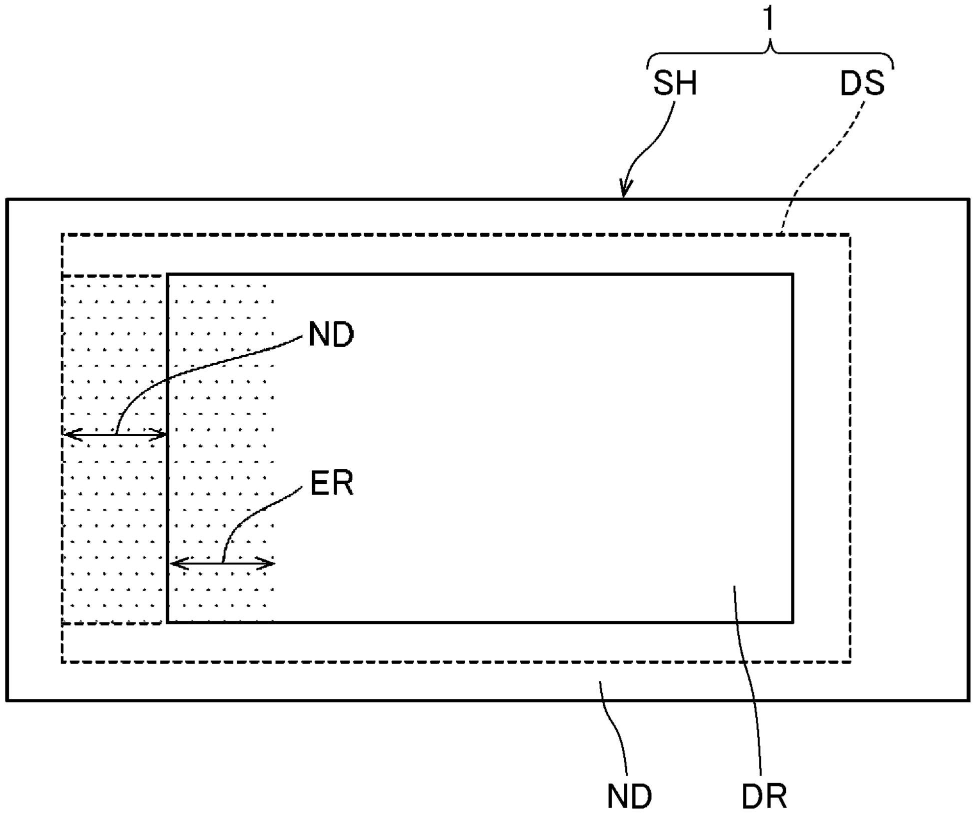
FIG. 7 is a first front view illustrating a positional relationship between an end display region and a non-display region of a display device according to a fourth embodiment.
Figure 8:
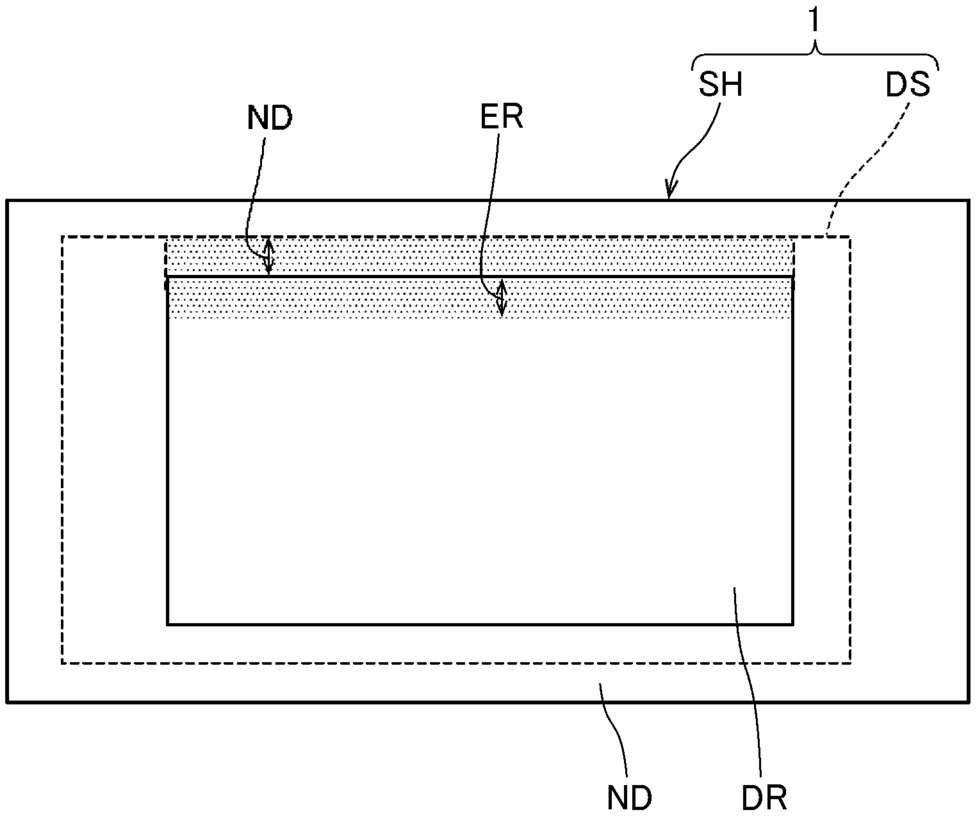
FIG. 8 is a second front view illustrating a positional relationship between the end display region and the non-display region of the display device according to the fourth embodiment.
Figure 9:
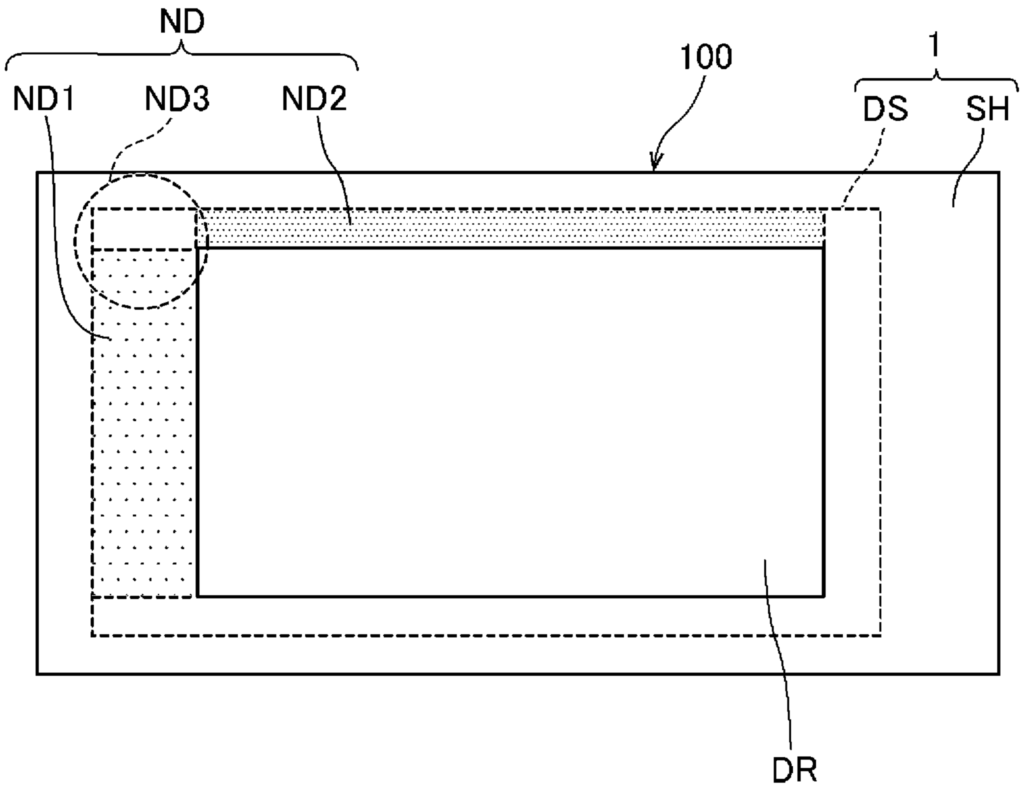
FIG. 9 is a front view illustrating a position of a third non-display region adjacent to both a first non-display region and a second non-display region of the display device according to the fourth embodiment.
Figure 10:
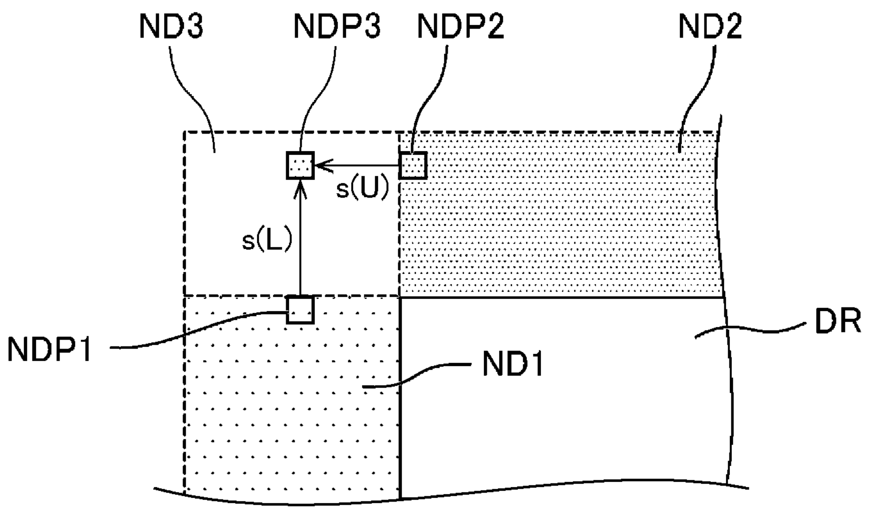
FIG. 10 is an enlarged view of the third non-display region of FIG. 9.

FIGS. 7 and 8 are, respectively, first and second front views illustrating the positional relationship between the end display region ER and the non-display region ND of the display device 10 according to the fourth embodiment. FIG. 9 is a front view illustrating a position of a third non-display region ND3 adjacent to both a first non-display region ND1 and a second non-display region ND2 of the display device 10 according to the fourth embodiment. FIG. 10 is an enlarged view of the third non-display region ND3 of FIG. 9.

As can be seen from FIGS. 7 to 10, the non-display region ND includes the first non-display region ND1 adjacent to the display region DR, the second non-display region ND2 adjacent to the display region DR, and the third non-display region ND3 adjacent to both the first non-display region ND1 and the second non-display region ND2. The control unit C lights the third non-display region ND3 in a state corresponding to the lighting state of the first non-display region ND1 and the lighting state of the second non-display region ND2.

More specifically, the control unit C (more specifically, the non-display region data generation unit G) determines a first gray scale value L_enD [CV] of a first pixel NDP1 and a second gray scale value U_enD [CV] of a second pixel NDP2 indicating the lighting state of each of the first non-display region ND1 and the second non-display region ND2 by the method according to any one of the first to third embodiments described above. Next, the control unit C determines a distance s (L) from the first pixel NDP1 of the first non-display region ND1 to the third pixel NDP3 of the third non-display region ND3. The control unit C determines a distance s (U) from the second pixel NDP2 of the second non-display region ND2 to the third pixel NDP3 of the third non-display region ND3. The first pixel NDP1 and the second pixel NDP2 are included in the same column (vertical direction). The first pixel NDP1 and the third pixel NDP3 are included in the same row (horizontal direction). Thereafter, the control unit C calculates a third gray scale value LU_nD [CV] of the third pixel NDP3 by the following equation.

$$\text{LU\_nD }[CV]=[\text{L\_enD }[CV]\times s(U)+\text{U\_enD }[CV])\times s(L)]\div[s(U)+s(L)]$$

Since the control unit C according to the fourth embodiment can degrade the display region DR and the non-display region ND to the same extent even when the display region DR and the display panel DS are shifted in any of the left-right direction and the up-down direction, it is possible to make the contrast at the boundary between the pixel group having a large image sticking amount and the pixel group having a small image sticking amount inconspicuous.

Fifth Embodiment

Next, a display device according to the fifth embodiment will be described. Note that description of respects similar to those in the first embodiment will not be repeated below. The present embodiment is different from the first embodiment in the following respects.

A display device 10 according to the present embodiment differs from the display device 10 according to the first embodiment in that each unit of the control unit C is realized by control processing performed by a display control program. In other respects, the display device 10 according to the present embodiment has a similar configuration to that of the display device 10 according to the first embodiment.

More specifically, the memory M, the non-display region data generation unit G, the read control unit R, the display region shift amount determination unit S, and the moving amount conversion unit O are realized by control processing executed by the display control program.

In other words, a computer serving as the control unit C includes a processor operating in accordance with the display control program, for example, a central processing unit (CPU) as a main hardware configuration. The processor may be of any type as long as it can realize functions by executing the display control program. The processor is configured with one or multiple electronic circuits including a semiconductor integrated circuit, for example, an integration circuit (IC) or a large scale integration (LSI). The multiple electronic circuits may be integrated into one chip, or may be provided in a plurality of chips. The plurality of chips may be aggregated into one device, or may be provided in a plurality of devices.

The display control program is recorded in a tangible non-transitory recording medium such as a computer-readable read only memory (ROM), an optical disk, a hard disk drive, or the like. A content providing program may be stored in advance in the recording medium, or may be supplied to the recording medium via a wide-area communication network including the Internet or the like.

The invention claimed is:

1. A display device comprising:

a display panel including a display region, in which an input image associated with input image data is displayed, and a non-display region that is a region other than the display region and that does not display the input image, each of the display region and the non-display region including a plurality of self-light-emitting elements;

a moving mechanism configured to move the display panel along the display region; and a control unit configured to change a position of the display region in the display panel in such a manner that, when the control unit controls the moving mechanism to move the display panel, the position of the display region in space is maintained unchanged, wherein the control unit lights an entirety of the non-display region when the input image is displayed in the display region without decreasing illumination in the display region.

2. The display device according to claim 1, wherein the display region includes an end display region located at a predetermined distance from the non-display region, and the control unit lights the entirety of the non-display region based on the input image data input to the end display region.

3. The display device according to claim 2, wherein the control unit lights the entirety of the non-display region based on an average value of a plurality of gray scale values included in the input image data input to the end display region.

4. The display device according to claim 2, wherein the end display region includes at least one of a pixel column and a pixel row adjacent to the non-display region, and the control unit lights the entirety of the non-display region based on a plurality of gray scale values included in the input image data input to the at least one of the pixel column and the pixel row.

5. The display device according to claim 2, wherein the control unit lights the entirety of the non-display region in such a manner that a pattern that is mirrored symmetrically to the input image, displayed in the end display region, appears.

6. The display device according to claim 1, wherein the non-display region includes:

a first non-display region adjacent to the display region, a second non-display region adjacent to the display region, and a third non-display region adjacent to both the first non-display region and the second non-display region, and the control unit lights the third non-display region in a state corresponding to a lighting state of the first non-display region and a lighting state of the second non-display region.

7. The display device according to claim 1, further comprising:

a light blocking portion configured to block light emitted from the non-display region.

8. A display device comprising:

a display panel including a display region that is an observation region which is visually recognizable by a person, and a non-display region that is defined as all regions other than the display region, each of the display region and the non-display region including a plurality of self-light-emitting elements;

a moving mechanism configured to move the display panel along the display region; and a control unit configured to change a position of the display region in the display panel in such a manner that, when the control unit controls the moving mechanism to move the display panel, the position of the display region in space is maintained unchanged, wherein the control unit lights an entirety of the non-display region when the input image is displayed in the display region without decreasing illumination in the display region.

* * * * *